United States Patent [19]

Kesten

[11] Patent Number: 5,291,735

[45] Date of Patent: Mar. 8, 1994

[54] HIGH EFFICIENCY, HYDROGEN-DRIVEN COOLING DEVICE

[75] Inventor: Arthur S. Kesten, West Hartford, Conn.

[73] Assignee: United Technologies Corporation, Hartford, Conn.

[21] Appl. No.: 35,812

[22] Filed: Mar. 23, 1993

[51] Int. Cl.$^5$ ............................................ F25B 27/00
[52] U.S. Cl. ........................................ 62/4; 62/236; 62/238.4; 62/467; 62/501; 60/39.12; 423/651
[58] Field of Search .................. 62/46.2, 236, 238.4, 62/501, 4, 467; 60/39.12; 423/651

[56] References Cited

U.S. PATENT DOCUMENTS

| | | | |
|---|---|---|---|
| 4,346,752 | 8/1982 | Kesten et al. | 165/1 |
| 4,347,711 | 9/1982 | Noe et al. | 62/238.4 X |
| 4,476,918 | 10/1984 | Kesten | 165/1 |
| 4,478,814 | 10/1984 | Kesten et al. | 423/650 |
| 4,567,033 | 1/1986 | Kesten | 423/648 R |
| 4,614,176 | 9/1986 | Kesten | 126/110 R |
| 4,712,610 | 12/1987 | Kesten et al. | 165/104.12 |
| 4,754,607 | 7/1988 | Mackay | 62/236 X |
| 4,850,859 | 7/1989 | Kesten et al. | 431/328 |
| 4,942,733 | 7/1990 | Hosford | 60/39.12 X |
| 4,999,993 | 3/1991 | Rao | 60/39.12 X |
| 5,129,236 | 7/1992 | Solomon | 62/236 X |
| 5,133,180 | 7/1992 | Horner et al. | 60/39.12 |
| 5,136,854 | 8/1992 | Abdelmalek | 62/238.4 X |

OTHER PUBLICATIONS

Y. Saito, M. Yamashita, and E. Ito, "Hydrogen Production From 2-Propanol as a Key Reaction For Chemical Heat Pump With Reaction Couple of 2-Propanol Dehydrogenation/Acetone Hydrogenation", *Hydrogen Energy Progress VIII*, Proc. 8th World Hydrogen Energy Conference (Jul. 1990, Honolulu). Pergamon Press vol. 1, 338-45.

M. Yamashita, F. Dai, M. Suzuki and Y. Saito, "Mechanism of 2-Propanol Dehydrogenation With Suspended Nickel Fine-Particle Catalyst", *Bull. Chem. Soc. Japan*, vol. 64, No. 2, pp. 628-634 (1991).

E. Ito, M. Yamashita, S. Hagiwara, and Y. Saito, "A Composite Ru-Pt Catalyst for 2-Propanol Dehydrogenation Adoptable to the Chemical Heat Pump System", *Chemistry Letters*, pp. 351-354 (1991).

H. Buchner, "Hydrogen Use—Transportation Fuel" *Brit. J. Hydrogen Energy*, vol. 9, No. 6, pp. 501-514 (1984).

M. Yamashita, T. Kawamura, M. Suzuki and Y. Saito, "Characteristics of Suspended Ru/Carbon Catalyst for 2-Propanol Dehydrogenation Applicable to Chemical Heat Pump", *Bull. Chem. Soc. Japan*, vol. 64, No. 1, pp. 272-278 (1991).

Y. Saito, M. Yamashita, K. Yukawa and H. Itagaki, "Chemical Conversion of Thermal Energy Using Liquid-Phase Dehydrogenation of 2-Propanol or Cyclohexanes", Department of Industrial Chemistry, Faculty of Engineering, University of Tokyo, Bunkyo-ku, Tokyo, Japan, pp. 113-121.

M. Yamashita, E. Ito, and Y. Saito, "Liquid-Phase Dehydrogenation of 2-Propanol as the Key Reaction for 2-Propanol/Acetone/Hydrogen Chemical Heat Pump System", Department of Industrial Chemistry, Faculty of Engineering, University of Tokyo, Bunkyo-ku, Tokyo, Japan, pp. 197-205.

*Primary Examiner*—Henry A. Bennett
*Assistant Examiner*—Christopher Kilner
*Attorney, Agent, or Firm*—George J. Romanik

[57] ABSTRACT

A cooling device cools a conditioned space (6) by transferring heat from the conditioned space to a working fluid (2) in a heat exchanger (4). A compressor (10) compresses the working fluid (8), which is then condensed in a condenser (14). Heat from the condenser is transferred to a dehydrogenation reaction zone (104) that includes a dehydrogenation catalyst (106) to supply a portion of an endothermic heat of reaction. The catalyst (106) is contacted with an organic hydride (102) to dehydrogenate the organic hydride to form $H_2$ (108) and at least one dehydrogenation product (110). A combustor (112) burns the $H_2$ (108) to form combustion products (144) that expand in a turbine (116) to drive the compressor (10). A portion of the heat of combustion is used to supply the remainder of the endothermic heat of reaction required in the dehydrogenation reaction zone (104).

30 Claims, 3 Drawing Sheets

HIGH EFFICIENCY, HYDROGEN-DRIVEN COOLING DEVICE

TECHNICAL FIELD

The present invention is directed to a hydrogen-powered cooling device.

BACKGROUND ART

Air conditioning, refrigeration, and other cooling devices have long been known. Typically, such devices operate by transferring heat from a conditioned space to a liquid working fluid, thereby boiling the working fluid. The gaseous working fluid is then compressed, condensed to a liquid, and recycled to absorb additional heat from the conditioned space. Compressing the working fluid requires an energy input to the cooling device. Condensing the working fluid rejects heat to the environment. This represents a loss of potentially useable energy. As the industry constantly strives to improve the efficiency of cooling devices, it would be desirable to find a practical use for the energy rejected by condensing the working fluid. In addition, it would be desirable to reduce the energy input needed to compress the working fluid.

DISCLOSURE OF THE INVENTION

The present invention is directed to a more efficient cooling device that uses the energy rejected by condensing the working fluid and requires a smaller energy input than prior art devices to compress the working fluid.

One aspect of the invention includes a cooling device having a cooling section and a power section. The cooling section includes a working fluid and a heat exchanger in heat transfer relationship with a conditioned space. The heat exchanger transfers heat from the conditioned space to the working fluid, thereby cooling the conditioned space and converting the working fluid from a low pressure liquid to a low pressure gas. A compressor in fluid communication with the heat exchanger compresses the working fluid from a low pressure gas to a high pressure gas. A condenser in fluid communication with the compressor removes heat from the working fluid, thereby condensing the working fluid from a high pressure gas to a high pressure liquid. Means for expanding the working fluid, which are in fluid communication with the condenser, convert the working fluid from a high pressure liquid to a low pressure liquid. The cooling section also includes means for conveying the working fluid from the means for expanding to the heat exchanger.

The power section includes a dehydrogenation reaction zone, a dehydrogenation catalyst disposed in the reaction zone, and means for supplying an endothermic heat of reaction to the reaction zone. A portion of the heat of reaction is supplied by the heat removed from the working fluid in the condenser. The section also includes means for contacting the catalyst with an organic hydride such that the organic hydride dehydrogenates to form $H_2$ and at least one dehydrogenation product. A combustor in fluid communication with the reactor, in conjunction with means for supplying an oxygen-containing gas to the combustor, burns the $H_2$ to form combustion products. A turbine in fluid communication with the combustor and mechanical drive relationship with the compressor expands the combustion products to form exhaust gases, thereby providing energy to drive the compressor.

Another aspect of the invention includes a method of cooling a conditioned space with the device described above.

These and other features and advantages of the present invention will become more apparent from the following description and accompanying drawing.

BEST MODE FOR CARRYING OUT THE INVENTION

Figure 1:
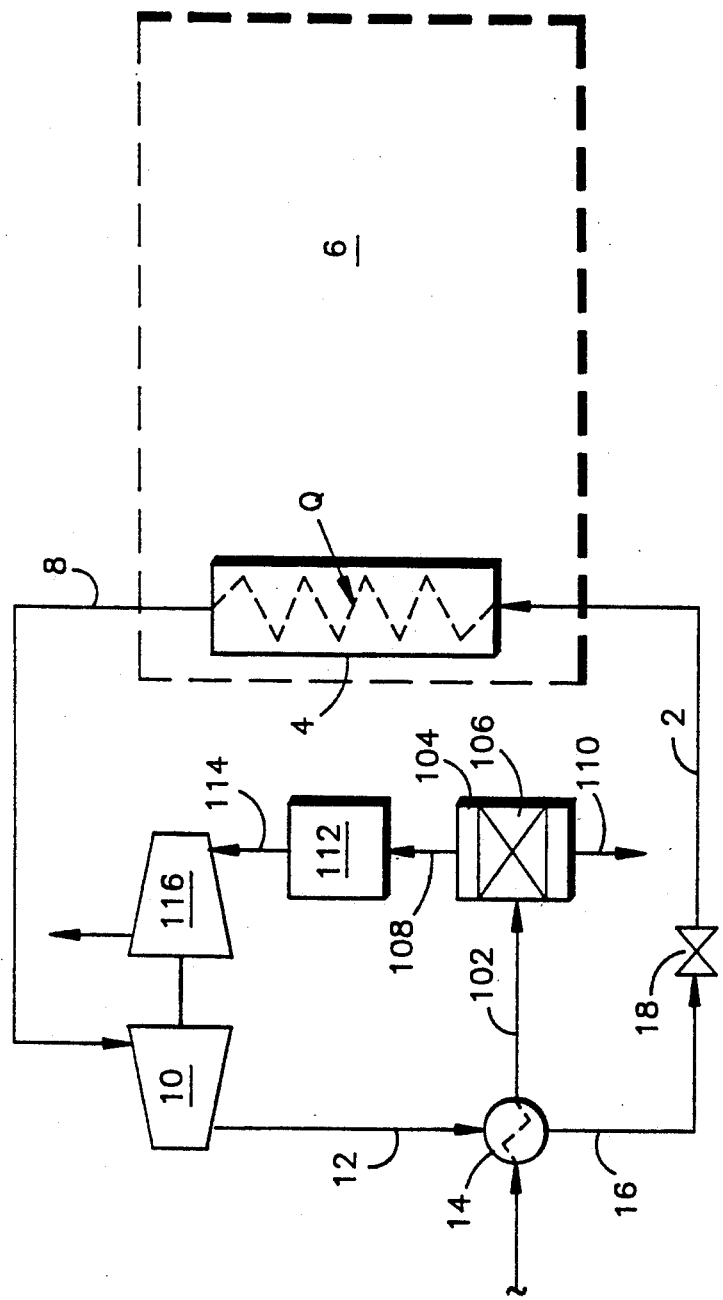
FIG. 1 is a process flow diagram of a basic embodiment of the present invention.

The present invention integrates a cooling section with a hydrogen-driven power section to improve the efficiency of a cooling device such as an air conditioner or refrigerator. The cooling section may be a conventional cooling section as shown in FIG. 1. A working fluid 2, which may be any conventional heat transfer fluid, flows through a heat exchanger 4 in heat transfer relationship with a conditioned space 6. The heat exchanger 4 transfers heat from the conditioned space 6 to the working fluid, thereby cooling the conditioned space and converting the working fluid from a low pressure liquid to a low pressure gas 8. The working fluid 8 flows to a compressor 10 in fluid communication with the heat exchanger 4 where the working fluid is compressed to a high pressure gas 12. After being compressed, the working fluid 12 flows to a condenser 14 in fluid communication with the compressor to where the working fluid is condensed to a high pressure liquid 16. The working fluid 16 flows to means for expanding the working fluid 18 where the working fluid is converted to a low pressure liquid 2. The means for expanding 18 may be any conventional pressure drop device such as a valve or a turbine. Finally, the working fluid 2 returns to the heat exchanger 4 through a duct or any other conventional means for conveying the working fluid where it recycles through the cooling section. One skilled in the art will know how to size the equipment in the cooling loop and select an appropriate working fluid.

In the power section, an organic hydride 102 flows to a reaction zone 104 where it contacts a dehydrogenation catalyst 106. The reaction zone 104 is supplied with an endothermic heat of reaction that causes the organic hydride to decompose into $H_2$ 108 and a dehydrogenation product 110. At least a portion of the heat of reaction comes from heat rejected by the condenser 14. The heat may be transferred from the condenser 14 to the reaction zone 104 by any conventional means, such as directing the organic hydride 102 through the condenser 14 as shown. Depending on the heat of reaction and the heat available from the condenser 14, heat from another source, internal or external, may be needed to supply the entire heat of reaction. When the device is started, an external energy source (not shown) may provide the entire heat of reaction for a short time. The $H_2$ 108 flows into a combustor 112 where it burns to form combustion products 114. The combustion products 114 flow to a turbine 116 in mechanical drive relationship with the compressor 10 to drive the compressor. The dehydrogenation product 110 may be collected for recycling into the organic hydride by catalytically hydrogenating the dehydrogenation product at an off-site location with a conventional process.

The organic hydride may be any hydrocarbon or alcohol that can be dehydrogenated to form $H_2$ and at least one dehydrogenation product. Preferably, the organic hydride will have one to 14 carbon atoms. Suitable normal alkanes include pentane, heptane, and decane. Suitable cycloalkanes include cyclohexane, methylcyclohexane, and decalin. Suitable alcohols include methanol, ethanol, and propanol. If desired, the organic hydride may be a custom or commercial blend of two or more hydrocarbon or alcohol species. Suitable commercial blends of hydrocarbons include Norpar TM and Isopar TM, available from Exxon Company, U.S.A. (Houston, Tex.). Preferably, both the organic hydride and its dehydrogenation product(s) will be liquids at room temperature and atmospheric pressure so they are easy to handle. In addition, the organic hydride will preferably be of sufficient purity that neither its constituents nor its dehydrogenation products interfere with the dehydrogenation reaction or any processes of the present invention. Most preferably, the organic hydride will have a single, predominant dehydrogenation product. Methylcyclohexane ($C_7H_{14}$) and 2-propanol (($CH_3)_2CHOH$) are preferred organic hydrides because they are liquids at room temperature and atmospheric pressure and dehydrogenate to $H_2$ and a predominant dehydrogenation product with minimal formation of side products. As shown by equations (1) and (2), methylcyclohexane's predominant dehydrogenation product is toluene ($C_7H_{14}$) and 2-propanol's predominant dehydrogenation product is acetone (($CH_3)_2CO$).

$$C_7H_{14} \rightarrow C_7H_8 + 3H_2 \quad (1)$$

$$(CH_3)_2CHOH \rightarrow (CH_3)_2CO + H_2 \quad (2)$$

Although these reactions are equilibrium reactions, they can be shifted to near completion by removing $H_2$ from the reaction zone as soon as it forms.

Any dehydrogenation catalyst known in the art may be used in the present invention. For example, the catalyst 106 may comprise Ni, Cr, Co, or platinum family metals, such as Pt, Ru, Rh, Re, Ir, and Pd. Catalysts that comprise platinum family metals are preferred because they provide favorable operating conditions for the dehydrogenation reaction of the present invention. The catalyst may comprise a single metal or a combination of two or more suitable metals (e.g., Pt/Re or Pt/Ir). Cluster or composite catalysts, especially those that comprise a combination of platinum family metals (e.g., Ru/Rh or Ru/Pt), are especially preferred because of their potential to reduce drastically the temperature and pressure (i.e., the energy) needed to perform the dehydrogenation reaction.

The metals in the catalyst may be supported on a substrate compatible with reaction conditions. Suitable substrates include alumina, zirconia, carbon, and other materials. Depending on the requirements of a particular application, the substrate may be particles disposed in a packed bed, fine particles dispersed in a liquid, a monolithic structure such as a honeycomb structure, a coating on the wall of a duct or vessel, or some other suitable form. These substrates are known in the art. The appropriateness of a particular substrate depends on whether the dehydrogenation reaction takes place in the liquid phase or gas phase and the pressure drop that can be tolerated though the catalyst. The reaction zone in which the catalyst is disposed may be designed with conventional techniques.

Suitable dehydrogenation catalysts may be purchased from many commercial suppliers, including Englehard Corporation (Iselin, N.J.), Johnson Mathey, Inc. (Malvern, Pa.), and UOP (Des Plaines, Ill.). The carbon-supported platinum family single metal (particularly Ru and Rh) and composite catalysts (particularly Ru/Rh and Ru/Pt) described by Yasukazu Saito of the University of Tokyo and his colleagues are especially promising. Some of these catalysts, for example a 5 wt % Ru/carbon catalyst, may be purchased from commercial suppliers such as N.E. Chemcat Co. A composite catalyst may be made by adsorbing $RuCl_3$ and $RhCl_3$ or $RuCl_3$ and $K_2PtCl_4$ in a suitable atomic ratio of Ru:Rh or Ru:Pt onto activated carbon supports from an aqueous solution at room temperature. The adsorption may take from 6 hr to about 8 hr. For a Ru/Pt catalyst, good results have been reported with Ru:Pt ratios of 4:1, 1:1, and 1:4 and total metal loadings of about 5 wt %. The activated carbon should have a large specific surface area, for example about 2770 m/g. Such activated carbon is available from Kansai Netsukagaku Co. (Japan). The adsorbed metal chlorides may be reduced to catalytic metals with an aqueous solution of $NaBH_4$ (900 mg/10 ml) by adding the $NaBH_4$ dropwise (about 1 ml/min) to the metal chloride solution. After allowing the metal chloride solution to stand for about 10 min, the carbon supported catalyst may be filtered from the solution, washed with large amounts of water, and dried. The catalyst may be dried under a vacuum at about 50° C. for about 10 hr.

The dehydrogenation reaction of the present invention may occur in either the gas phase or liquid phase over a wide range of temperatures, pressures, and space velocities. For example, the reaction may take place at pressures between about 10 kPa (absolute) and about 7000 kPa and temperatures between about 80° C. and about 760° C. The space velocity also may vary over a wide range depending on system requirements. Typically, commercial dehydrogenation catalysts common in the petroleum refining industry operate with the organic hydride in the gas phase. By contrast, carbon-supported catalysts like those used by Saito can be used with liquid phase reactions. The operating conditions for a particular application depend on the amount and type of catalyst and the composition of the organic hydride. One skilled in the art will know how to select appropriate operating conditions for the present invention.

Figure 2:
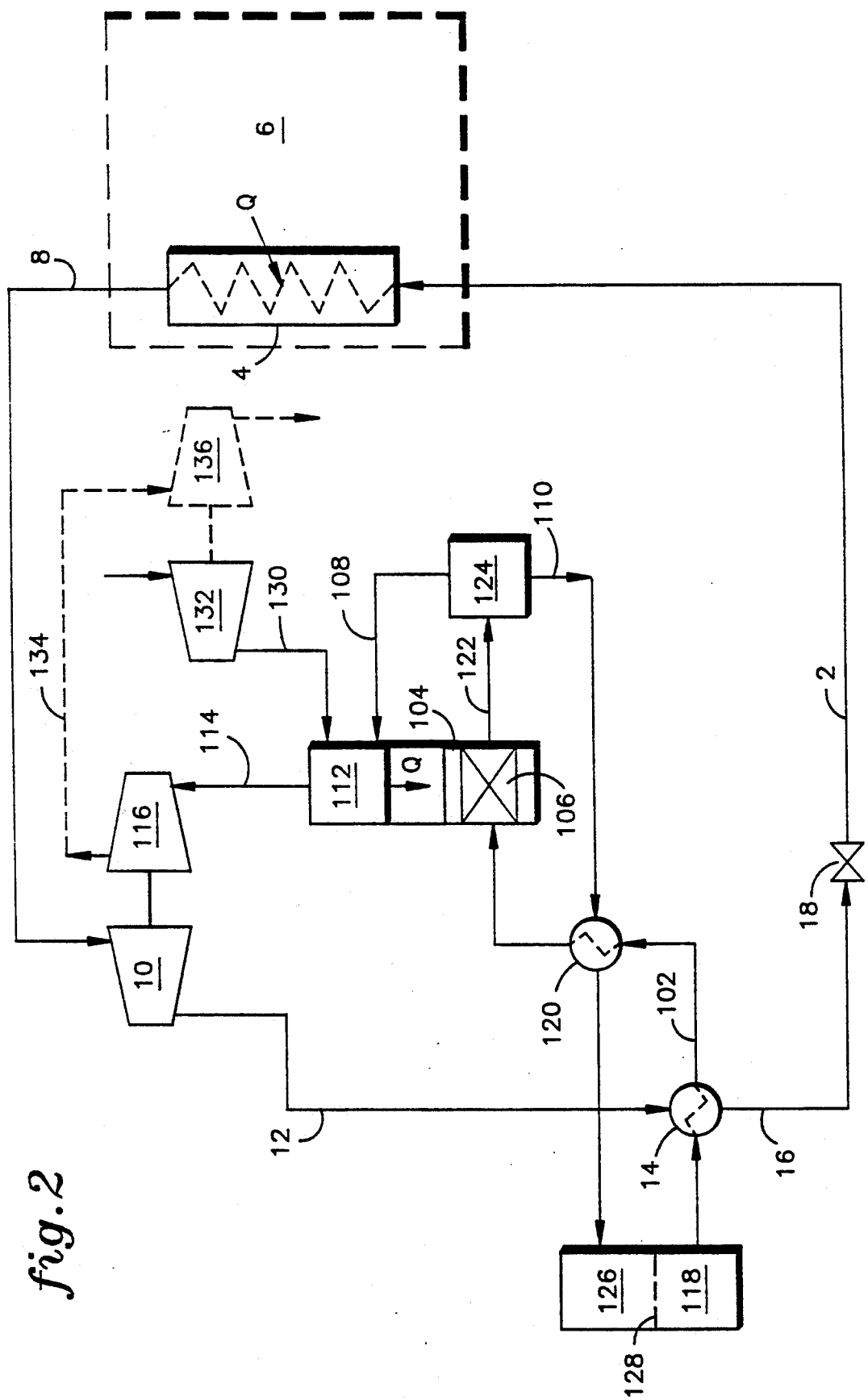
FIG. 2 is a process flow diagram of a more detailed embodiment of the present invention.

The present invention can be further understood from FIG. 2, which depicts a more detailed embodiment of the invention. The embodiment of FIG. 2 is especially suited for a gas phase dehydrogenation reaction. An organic hydride 102 flows from a supply vessel 118 through the condenser 14 and a feed/dehydrogenation product heat exchanger 120 to the reaction zone 104 where it contacts the catalyst 106. As the organic hydride flows through the condenser 14 and heat exchanger 120 it vaporizes and absorbs a portion of the heat of reaction. Upon contacting the catalyst 106, the organic hydride decomposes into a product stream 122 that comprises $H_2$ and the dehydrogenation product. To shift the dehydrogenation reaction to near completion, the product stream 122 is routed to a separator 124 that separates the product stream into $H_2$ 108 and the dehydrogenation product 110.

The separator 124 may be any device capable of separating the $H_2$ 108 from the dehydration product 110. For example, the separator may comprise a membrane through which $H_2$ preferentially diffuses. A suitable family of $H_2$ specific membranes, called Prism ™ Separators, is available from Permea Corporation (St. Louis, Mo.). Preferably, the separator 124 will comprise a Pd membrane. The thickness of the Pd membrane, which may be between about 0.01 mm and about 10 mm, depends on the rate of diffusion required and the pressure drop that can be tolerated. One skilled in the art can readily determine the appropriate thickness using a source such as Chapter 5 of "Diffusion In and Through Solids" by Richard M. Barrer (Cambridge University Press, London, 1941).

After exiting the separator 124, the dehydrogenation product stream 110 flows through the feed/dehydrogenation product heat exchanger 120 and into a storage vessel 126. The storage vessel 126 may be a portion of the supply vessel 116, with the dehydrogenation product separated from the organic hydride by an impervious diaphragm 128, or may be a separate vessel. The dehydrogenation product may later be removed from the storage vessel 126 for conversion to the organic hydride in a conventional hydrogenation reaction.

The $H_2$ flows to the combustor 112 where it mixes with an oxygen-containing gas, such as air 130, supplied by an air handling device 132 and burns. The air handling device 132 may be a compressor, fan, or any other device capable of supplying air or another oxidant to the combustor 112. As the $H_2$ 108 burns, it forms combustion products 114 and a heat of combustion. A portion of the heat of combustion, for example up to about 30%, may be transferred to the reaction zone 104 by any conventional means to supply a portion of the endothermic heat of reaction for the dehydrogenation reaction. The combustion products 114 flow to a turbine 116 where they expand to produce power that drives the compressor 10 and exhaust gases 134. Depending on the amount of energy remaining in the exhaust gases 134, the exhaust gases may be used to power the air handling device 132, for example, with a turbine 136.

Figure 3:
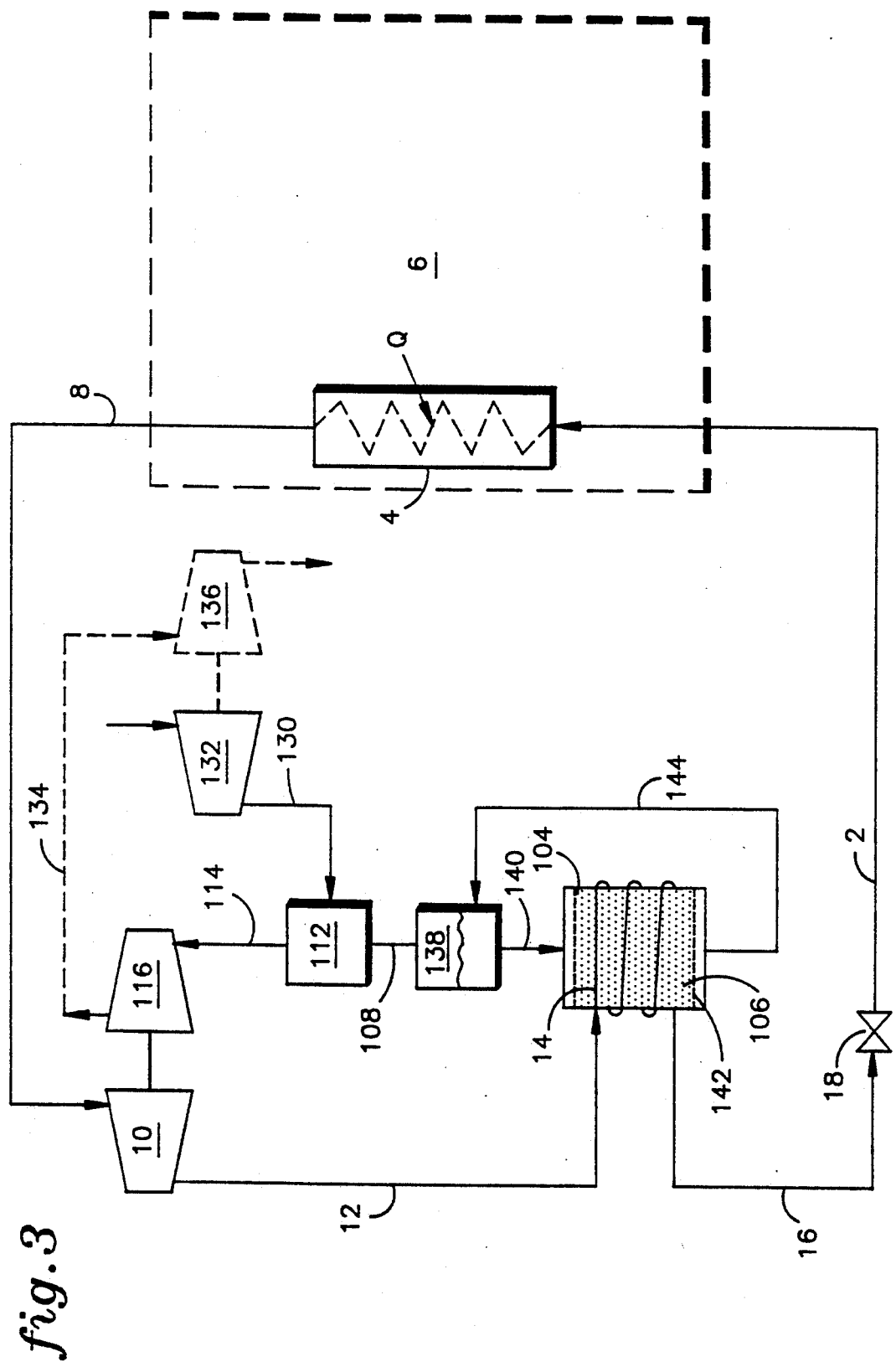
FIG. 3 is a process flow diagram of an alternate embodiment of the present invention.

FIG. 3 depicts an alternate embodiment of the present invention that eliminates the separator 124. The embodiment of FIG. 3 is especially suited for a liquid phase dehydrogenation reaction. A liquid mixture 140 of the organic hydride and dehydrogenation product is stored in a storage vessel 138. Initially, the mixture 140 contains predominantly organic hydride. The mixture 140 flows, for example by gravity, to the reaction zone 104 where it contacts the catalyst 106. The catalyst 106 may be in the form of fine particles suspended in the liquid inside the reaction zone 104. Screens 142 keep the catalyst 106 inside the reaction zone 104. The heat of reaction is supplied by the condenser 14, which may be in physical contact with the reaction zone 104 as shown. Depending on the organic hydride and catalyst used in the cooling device, the heat supplied by the condenser 14 may be sufficient to supply the entire heat of reaction required to drive the power section (except, of course, immediately upon start-up). As the decomposition reaction proceeds, gaseous $H_2$ 108 and a mixture 144 richer in the dehydrogenation product than the organic hydride are formed. The $H_2$ is evolved from the liquid mixture 140 and flows to the combustor 112, where it is burned to power the turbine 116. The mixture 144 flows back to the storage vessel 138. This flow may be driven by a density gradient between the reaction zone 104 and the storage vessel 138 as shown, or may be assisted by a pump. When the amount of organic hydride in the system becomes too low to support the dehydrogenation reaction, the material in the storage vessel 138 is replaced with fresh organic hydride. The dehydrogenation product removed from the storage vessel 138 is hydrogenated, preferably at an offsite location, and may eventually be recycled to the cooling device. Because the reaction in this embodiment is a liquid phase reaction, the catalyst 106 is preferably one of the carbon-supported catalysts described by Saito. These catalysts allow the reaction to proceed at temperatures slightly below that boiling point of the organic hydride.

The cooling devices of the present invention operate at higher efficiencies than prior art cooling devices because of the integration of the cooling and power sections. After startup, the devices can supply essentially all their own power by using heat rejected by condensing the working fluid in the cooling section to supply at least part of (and in some cases all) the heat of reaction to dehydrogenate the organic hydride to form $H_2$. Burning the $H_2$ provides energy to compress the working fluid and, if needed, to supplement the heat supplied by the condenser. By contrast, conventional cooling devices reject heat to the environment so the heat is not available to power the devices.

The devices of the present invention have the added benefit of being powered by $H_2$, a clean fuel that produces benign products (primarily $H_2O$) when it burns. Extracting the $H_2$ from a liquid organic hydride allows $H_2$ to be transported from a remote source as a liquid and stored under ambient temperature and pressure. For example, $H_2$ may be produced be electrolyzing water at a site that has a surplus of electric power, for example a remote hydroelectric plant, and used to hydrogenate the dehydrogenation product of the present invention.

The invention is not limited to the particular embodiments shown and described herein. Various changes and modifications may be made without departing from the spirit or scope of the claimed invention.

I claim:

1. A cooling device, comprising:
   (a) a cooling section that comprises:
      (i) a working fluid,
      (ii) a heat exchanger in heat transfer relationship with a conditioned space such that the heat exchanger transfers heat from the conditioned space to the working fluid, thereby cooling the conditioned space and converting the working fluid from a low pressure liquid to a low pressure gas,
      (iii) a compressor in fluid communication with the heat exchanger such to that the compressor compresses the working fluid from a low pressure gas to a high pressure gas,
      (iv) a condenser in fluid communication with the compressor such that the condenser removes heat from the working fluid, thereby condensing the working fluid from a high pressure gas to a high pressure liquid,
      (v) means for expanding the working fluid, thereby converting the working fluid from a high pressure liquid to a low pressure liquid, wherein the means for expanding are in fluid communication with the condenser, and
(vi) means for conveying the working fluid from the means for expanding to the heat exchanger, and
(b) a power section that comprises:
(i) a dehydrogenation reaction zone,
(ii) a dehydrogenation catalyst disposed in the reaction zone,
(iii) means for supplying an endothermic heat of reaction to the reaction zone, wherein a portion of the heat of reaction is supplied by the heat removed from the working fluid in the condenser,
(iv) means for contacting the catalyst with an organic hydride such that the organic hydride dehydrogenates to form $H_2$ and at least one dehydrogenation product,
(v) a combustor in fluid communication with the reaction zone such that the combustor burns the $H_2$ to form combustion products,
(vi) means for supplying an oxygen-containing gas to the combustor, and
(vii) a turbine in fluid communication with the combustor and in mechanical drive relationship with the compressor such that the turbine expands the combustion products to form exhaust gases, thereby providing energy to drive the compressor.

2. The device of claim 1, wherein the catalyst comprises Ni, Cr, Co, Pt, Ru, Rh, Re, Ir, or Pd.

3. The device of claim 1, wherein the reaction zone comprises a packed bed of the catalyst.

4. The device of claim 1, wherein the reaction zone comprises the catalyst suspended in a liquid, wherein the liquid comprises the organic hydride.

5. The device of claim 4, wherein the catalyst comprises a carbon support and at least one of Pt, Ru, Rh, Re, Ir, or Pd disposed on the carbon support.

6. The device of claim 1, wherein the reaction zone comprises a monolithic structure.

7. The device of claim 1, wherein the reaction zone comprises a coating of the catalyst on a wall of a duct or vessel.

8. The device of claim 1, wherein the organic hydride comprises a hydrocarbon or alcohol.

9. The device of claim 8, wherein the organic hydride comprises up to about 14 carbon atoms.

10. The device of claim 9, wherein the organic hydride comprises methylcyclohexane or 2-propanol.

11. The device of claim 1, wherein the means for supplying an endothermic heat of reaction include means for recovering heat from the dehydrogenation product.

12. The device of claim 1, wherein the means for supplying an endothermic heat of reaction include means for transferring heat from the combustor to the reaction zone.

13. The device of claim 1, wherein the condenser is in physical contact with the reaction zone, whereby the condenser transfers heat directly to the reaction zone.

14. The device of claim 1, wherein the means for supplying the oxygen-containing gas to the combustor includes an air handling machine in fluid communication with the turbine such that the exhaust gases drive the air handling machine.

15. The device of claim 1, further comprising: a separator for separating the $H_2$ from the dehydrogenation product.

16. The device of claim 15, wherein the separator comprises a Pd membrane.

17. A method of cooling a conditioned space, comprising:
(a) circulating a working fluid through a cooling section of a cooling device,
(b) transferring heat from the conditioned space to the working fluid, thereby cooling the conditioned space and converting the working fluid from a low pressure liquid to a low pressure gas,
(c) compressing the working fluid from a low pressure gas to a high pressure gas,
(d) removing heat from the working fluid, thereby condensing the working fluid from a high pressure gas to a high pressure liquid,
(e) transferring the heat removed from the working fluid to a reaction zone that comprises a dehydrogenation catalyst, wherein the heat removed from the working fluid supplies a portion of an endothermic heat of reaction,
(f) contacting the catalyst with an organic hydride such that the organic hydride dehydrogenates to form $H_2$ and at least one dehydrogenation product,
(g) burning the $H_2$ in the presence of an oxygen-containing gas to form combustion products, and
(h) expanding the combustion products in a turbine to form exhaust gases, wherein the turbine drives a compressor that compresses the working fluid.

18. The method of claim 17, wherein the catalyst comprises Ni, Cr, Co, Pt, Ru, Rh, Re, Ir, or Pd.

19. The method of claim 17, wherein the reaction zone comprises the catalyst suspended in a liquid, wherein the liquid comprises the organic hydride.

20. The method of claim 19, wherein the catalyst comprises a carbon support and at least one of Pt, Ru, Rh, Re, Ir, or Pd disposed on the carbon support.

21. The method of claim 17, wherein the organic hydride comprises a hydrocarbon or alcohol.

22. The method of claim 21, wherein the organic hydride comprises up to about 14 carbon atoms.

23. The method of claim 22, wherein the organic hydride comprises methylcyclohexane or 2-propanol.

24. The method of claim 17, wherein the organic hydride is dehydrogenated at a temperature between about 80° C. and about 760° C. and a pressure between about 10 kPa (absolute) and about 7000 kPa.

25. The method of claim 17, further comprising:
expanding the exhaust gases to drive an air handling machine that supplies the oxygen-containing gas.

26. The method of claim 17, further comprising:
transferring heat from the dehydrogenation product to the reaction zone to supply a portion of the heat of reaction.

27. The method of claim 17, further comprising:
transferring heat generated by burning the $H_2$ to the reaction zone to supply a portion of the heat of reaction.

28. The method of claim 17, wherein the heat removed from the working fluid supplies substantially all the heat of reaction.

29. The method of claim 17, further comprising:
separating the $H_2$ from the dehydrogenation product with a membrane.

30. The method of claim 17, further comprising separating the $H_2$ from the dehydrogenation product by allowing $H_2$ gas to bubble through a liquid in the reaction zone.

* * * * *